US008553024B2

(12) United States Patent
Tsai et al.

(10) Patent No.: US 8,553,024 B2
(45) Date of Patent: Oct. 8, 2013

(54) PIXEL DRIVING CIRCUIT OF AN ORGANIC LIGHT EMITTING DIODE

(75) Inventors: Hsuan-Ming Tsai, Hsin-Chu (TW); Chun-Yen Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 141 days.

(21) Appl. No.: 13/086,395

(22) Filed: Apr. 14, 2011

(65) Prior Publication Data

US 2012/0169693 A1 Jul. 5, 2012

(30) Foreign Application Priority Data

Dec. 30, 2010 (TW) ................................ 99147035 A

(51) Int. Cl.
*G09G 3/32* (2006.01)
*G06F 3/038* (2013.01)

(52) U.S. Cl.
USPC ............................................ 345/211; 345/82

(58) Field of Classification Search
None
See application file for complete search history.

(56) References Cited

U.S. PATENT DOCUMENTS

| | | | | |
|---|---|---|---|---|
| 6,862,008 | B2 * | 3/2005 | Yamazaki et al. | 345/62 |
| 7,317,433 | B2 * | 1/2008 | Chen et al. | 345/76 |
| 7,414,600 | B2 | 8/2008 | Nathan | |
| 7,532,187 | B2 * | 5/2009 | Afentakis et al. | 345/92 |
| 2007/0040770 | A1 * | 2/2007 | Kim | 345/76 |

* cited by examiner

*Primary Examiner* — James Wozniak
*Assistant Examiner* — Yaron Cohen
(74) *Attorney, Agent, or Firm* — Winston Hsu; Scott Margo

(57) ABSTRACT

A pixel driving circuit of an organic light emitting diode includes a first switch, a capacitor, a transistor, a second switch, a third switch and an organic light emitting diode. The operation of the pixel driving circuit includes three stages of resetting, data writing, and emitting. The pixel driving circuit is able to reset the transistor for de-trapping holes at stages of resetting and data writing. The image retention caused by the transistor hysteresis may be improved.

12 Claims, 8 Drawing Sheets

PIXEL DRIVING CIRCUIT OF AN ORGANIC LIGHT EMITTING DIODE

BACKGROUND

1. Technical Field

The present invention is related to a pixel driving circuit of an organic light emitting diode (OLED), and more particularly, to a pixel driving circuit of an OLED that is capable of reducing image retention.

2. Related Art

FIG. 1 is a diagram of a conventional organic light emitting diode (OLED) display panel. The display panel 10 includes a data driver 11, a scan driver 12 and a display array 13. The data driver 11 controls data lines DL1-DLn, and the scan driver 12 controls scan lines SL1-SLm. The display array 13 includes a plurality of pixel units each disposed at corresponding intersections of the data lines $DL_1$-$DL_n$ and the scan lines $SL_1$-$SL_m$. For example, the display unit 14 is disposed at the intersection of the data line DL1 and the scan line SL1. As illustrated in FIG. 1, the equivalent circuit of the display unit 14 (and also those of other display units) includes a switch transistor T11, a storage capacitor C11, a driving transistor T12 and an OLED D11, wherein the switch transistor T11 is an N-TYPE transistor, and the driving transistor T12 is a P-TYPE transistor.

The scan driver 12 sequentially outputs scan signals to the scan lines $SL_1$-$SL_m$ so that the switch transistors in the display units coupled to a certain row are turned on at the same time, while the switch transistors in the display units coupled to all other rows remained off. According to image data to be displayed, the data driver 11 outputs corresponding video signals (gray levels) to display units of one row via the data lines $DL_1$-$DL_n$. For example, when the scan driver 12 outputs scan signals to the scan line $SL_1$, the switch transistor T11 of the display unit 14 is turned on. The data driver 11 outputs the corresponding pixel data to the display unit 14 via the data line $DL_1$, thereby storing the pixel data voltage in the storage capacitor C11. The driving transistor T12 then provides driving current Isd to drive the OLED D11 according to the voltage stored in the storage capacitor C11.

Being a current driven component, the luminescence of the OLED D11 is determined by the value of the driving current Isd. The driving current Isd is the current flowing through the driving transistor T12, which may be represented by equation (1):

$$Isd = \frac{1}{2}k(Vsg - |Vth|)^2; \quad \text{Equation (1)}$$

wherein k represents the conduction parameter of the driving transistor T12, Vsg represents the voltage difference between the source and the gate of the driving transistor T12, and Vth represents the threshold voltage of the driving transistor T12.

However, due to the hole-trap in the channel of P-TYPE transistors, there may still be residual holes remaining in the channel of the transistors when the display panel 10 switches images. Hence there is an issue of image retention on the display panel 10.

SUMMARY

According to one embodiment, a pixel driving circuit of an organic light emitting diode (OLED) is provided. The pixel driving circuit comprises a first switch, a capacitor, a transistor, a second switch, a third switch and an OLED. The first switch includes a first end for receiving a data signal, a second end and a control end for receiving a scan signal. The capacitor includes a first end coupled to a first voltage source, and a second end coupled to the second end of the first switch. The transistor includes a first end, a control end coupled to the second end of the capacitor, a second end and a body. The second switch includes a first end coupled to the first voltage source, a second end coupled to the first end of the transistor, and a control end for receiving a control signal. The third switch includes a first end coupled to the body of the transistor, a second end coupled to a reference voltage source, and a control end for receiving the control signal. The OLED includes a first end coupled to the second end of the transistor, and a second end coupled to a second voltage source.

According to one embodiment, another pixel driving circuit of an OLED is provided. The pixel driving circuit comprises a first switch, a capacitor, a first transistor, a second transistor, a second switch, a second switch, a third switch and an OLED. The first switch includes a first end for receiving a data signal, a second end and a control end for receiving a scan signal. The capacitor includes a first end coupled to a first voltage source, and a second end coupled to the second end of the first switch. The first transistor includes a first end, a control end coupled to the second end of the capacitor, a second end and a body; the body includes a first end coupled to the first voltage source, and a second end. The second transistor includes a first end equal to the first end of the body of the first transistor, a control end coupled to the control end of the first transistor, and a second end coupled to the second end of the body of the first transistor. The second switch includes a first end coupled to the first voltage source, a second end coupled to the first end of the first transistor, and a control end for receiving a control signal. The third switch includes a first end coupled to the second end of the second transistor, a second end coupled to a reference voltage source, and a control end for receiving the control signal. The OLED includes a first end coupled to the second end of the first transistor, and a second end coupled to a second voltage source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
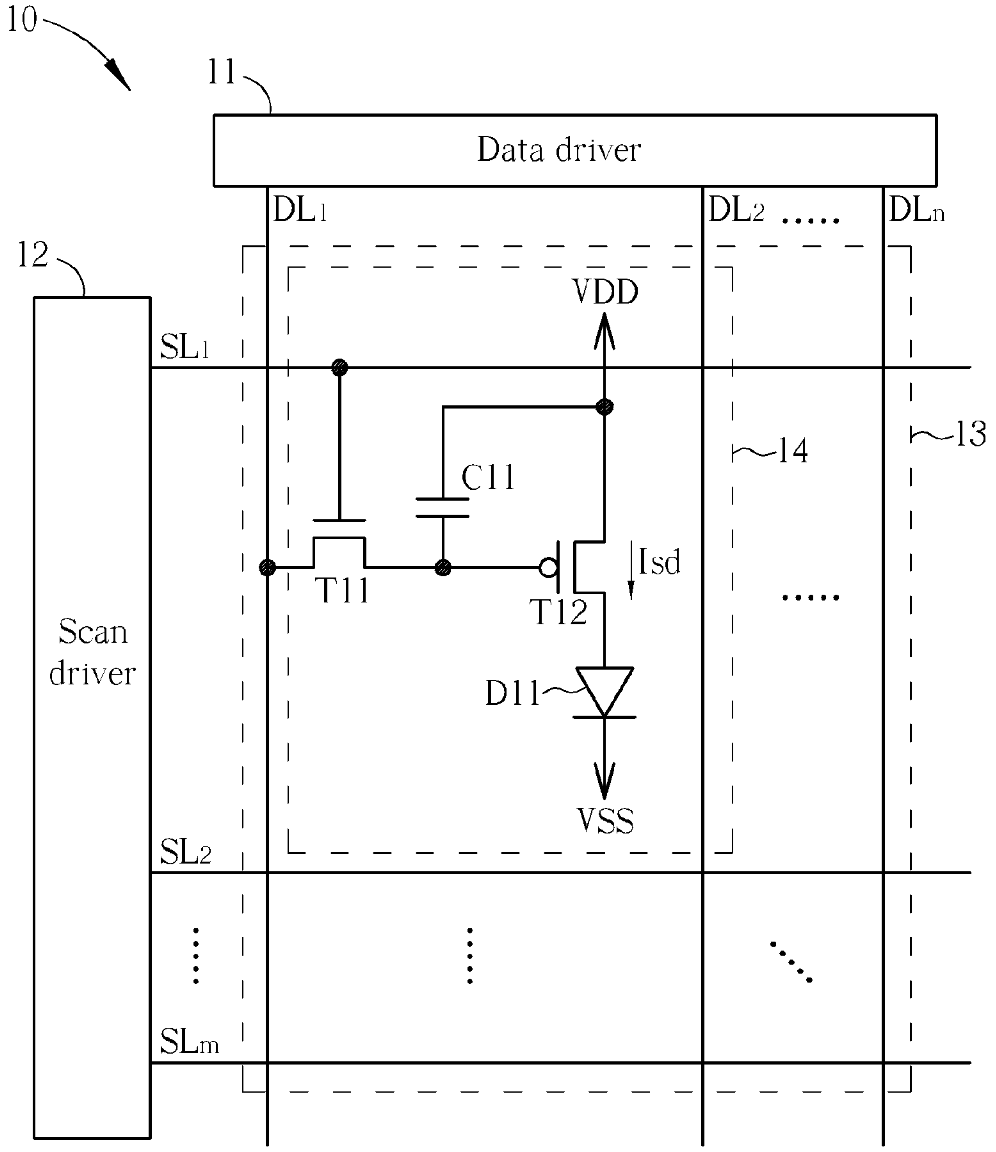
FIG. 1 PRIOR ART
FIG. 1 is a diagram of a conventional OLED display panel.
Figure 2:
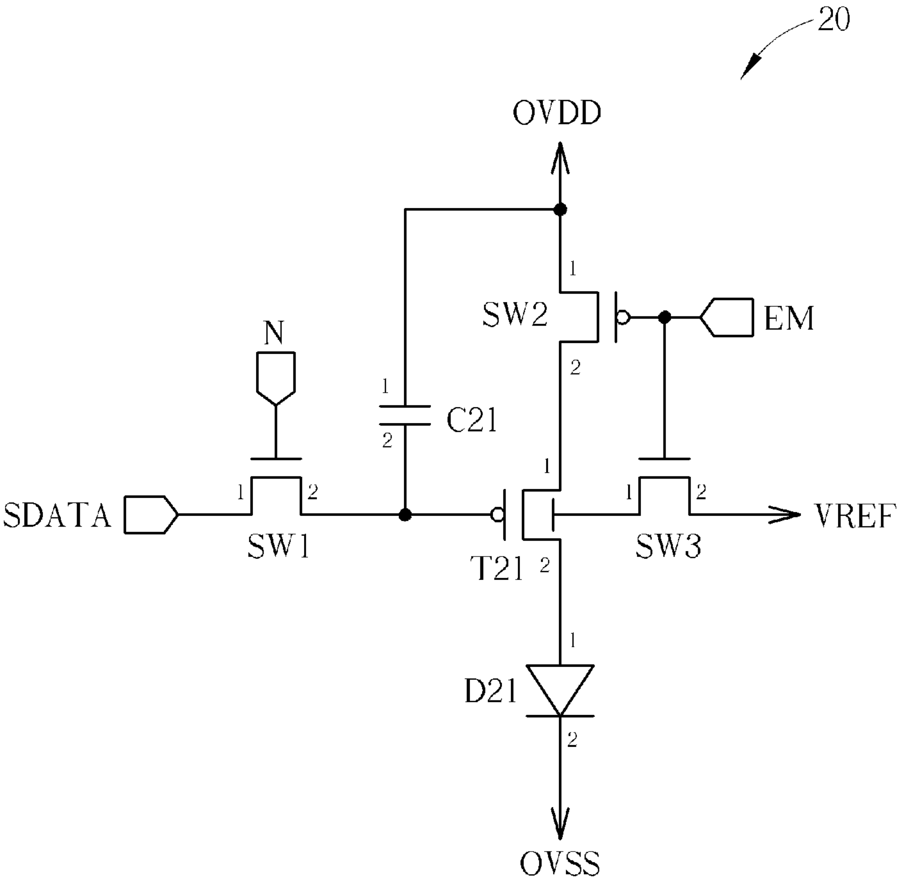
FIG. 2 is a diagram illustrating a pixel driving circuit of an OLED according to the first embodiment of the present invention.

FIG. 2 is a diagram illustrating a pixel driving circuit 20 of an OLED according to a first embodiment of the present invention. The pixel driving circuit 20 includes a first switch SW1, a capacitor C21, a transistor T21, a second switch SW2, a third switch SW3 and an OLED D21. The first switch SW1 includes a first end for receiving a data signal SDATA and a control end for receives a scan signal N. The capacitor C21 includes a first end coupled to a first voltage source OVDD and a second end coupled to a second end of the first switch SW1. The transistor T21 includes a control end coupled to the second end of the capacitor C21. The second switch SW2 includes a first end coupled to the first voltage source OVDD, a second end coupled to the first end of the transistor T21, and a control end for receiving a control signal EM. The third switch SW3 includes a first end coupled to a body of the transistor T21, a second end coupled to a reference voltage source VREF, and a control end for receiving the control signal EM. The OLED D21 includes a first end coupled to the second end of the transistor T21 and a second end coupled to a second voltage source OVSS. The second switch SW2 and the third switch SW3 are complementary switches, among which only one switch is turned on at the same time. In the present embodiment, the first switch SW1 and the third switch SW3 are N-TYPE transistors, while the second switch SW2 and the transistor T21 are P-TYPE transistors.

Figure 3:
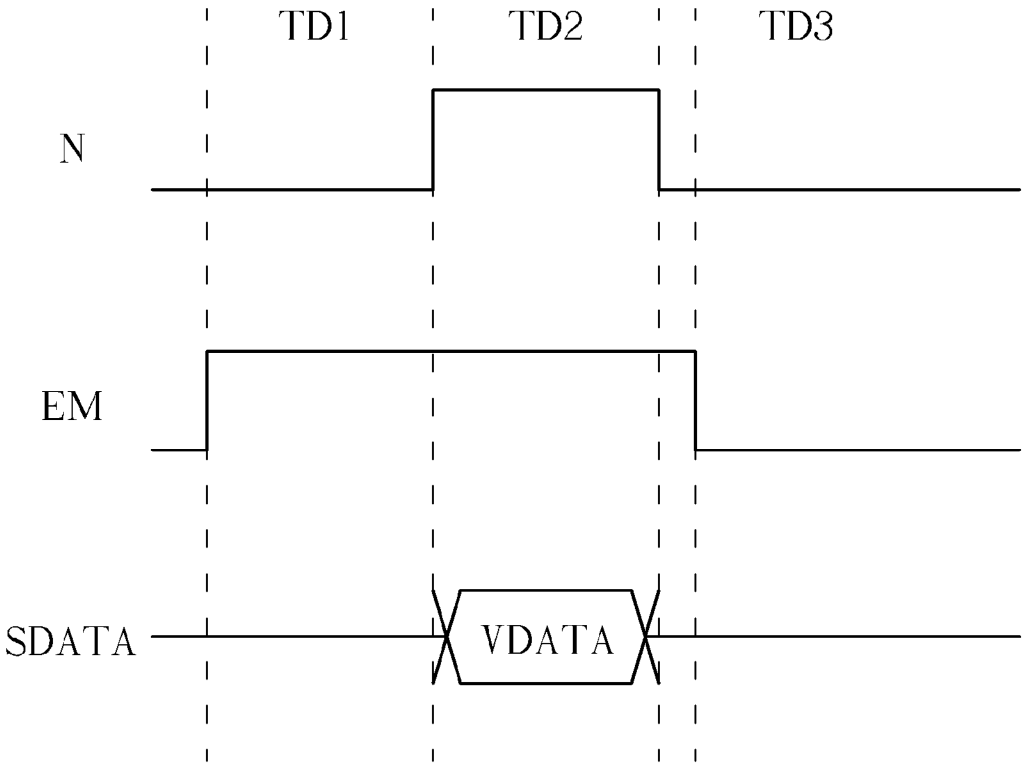
FIG. 3 is an operational wave diagram of the pixel driving circuit in FIG. 2.

FIG. 3 is an operational wave diagram of the pixel driving circuit 20 in FIG. 2. The operation of the pixel driving circuit 20 mainly includes 3 stages: resetting, data writing, and driving for light emission. During a time period TD1 when the pixel driving circuit 20 performs resetting, the first switch SW1 is turned off by the logic low scan signal N, the second switch SW2 is turned off by the logic high control signal EM, and the third switch SW3 is turned on. Therefore, the body of the transistor T21 is coupled to the reference voltage VREF via the third switch SW3, and the transistor T21 receives the voltage stored in the capacitor C21 at the control end, wherein the reference voltage VREF is a negative voltage. In this case, the first end and the second end of the transistor T21 are floating, and a positive voltage is applied between the control end and the body of the transistor T21, such that electrons may be injected from the N-TYPE body of the transistor T21 into the channel of the transistor T21 in order to help de-trap holes. If residual holes remain in the channel of the transistor T21, the next emission of the OLED D21 would be influenced, thereby causing image retention when switching images. The pixel driving circuit 20 of the present invention may improve image retention by de-trapping holes in the channel of the transistor T21.

During a time period TD2 when the pixel driving circuit 20 performs data writing, the first switch SW1 is turned on by the logic high scan signal N, thereby allowing the data voltage VDATA to be transmitted to the control end of the transistor T21. On the other hand, the second switch SW2 remains off and the third switch SW3 remains on as the control signal EM remains logic high during the time period TD2, thereby allowing hole de-trapping to proceed in the channel of the transistor T21.

During a time period TD3 when the pixel driving circuit 20 drives the OLED D21 for light emission, the first switch SW1 and the third switch are turned off and the second switch is turned on as the scan signal N and the control signal EM switch to logic low. When the third switch SW3 is turned off, the body of the transistor T21 is floating. The transistor T21 forms a channel according to the voltage at the control end. Therefore, the driving current IOLED of the OLED D21 is determined by the transistor T21.

Figure 4A:
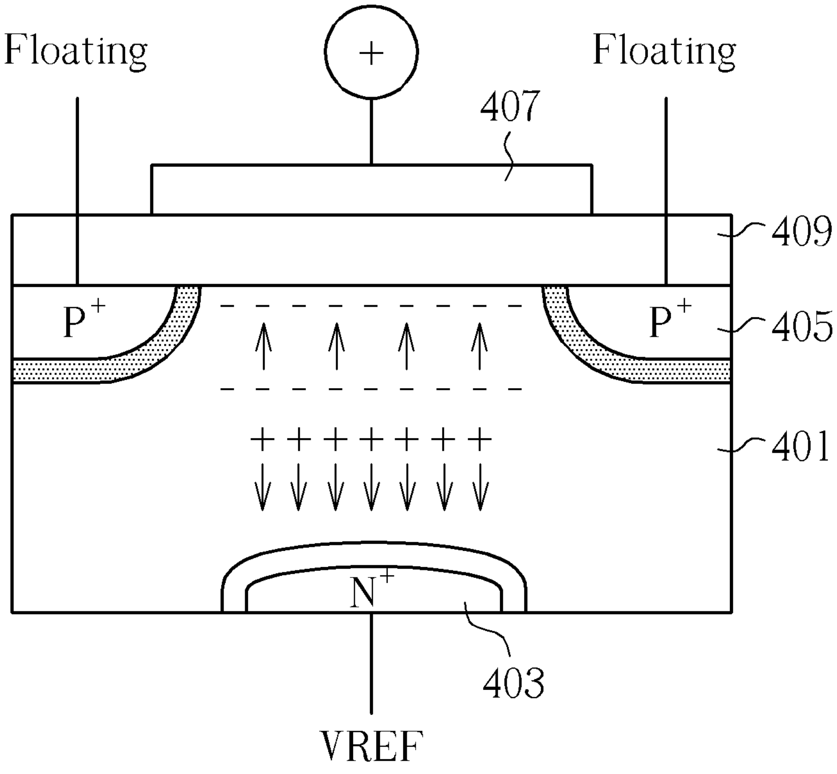
FIG. 4A is a diagram illustrating the process of de-trapping holes.
Figure 4B:
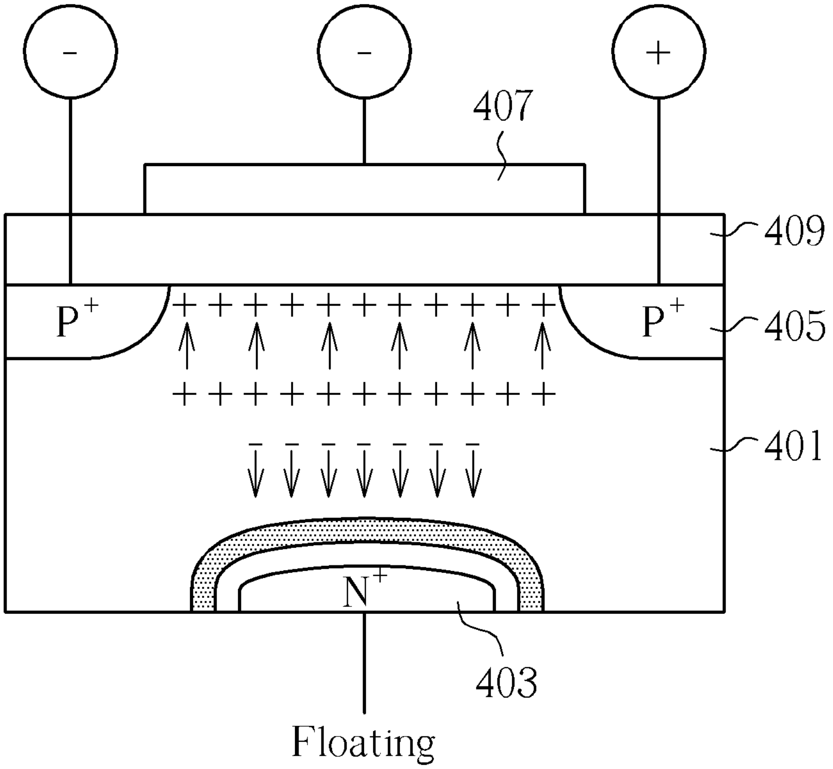
FIG. 4B is a diagram illustrating the driving of the transistor for light emission.

FIG. 4A is a diagram illustrating the process of de-trapping holes in the transistor. FIG. 4B is a diagram illustrating the driving of the transistor for light emission. As a P-TYPE transistor, the body of the transistor T21 is N-TYPE semiconductor 401 coupled to the reference voltage VREF via an N+ doping area 403, the first end and the second end of the transistor T21 are P+ doping areas 405, and the control end of the transistor T21 is formed by a gate metal layer 407 and a gate insulating layer 409. As illustrated in FIG. 4A, during the time periods TD1 and TD2, the second switch SW2 is turned off and the third switch SW3 is turned on. Therefore, the P+ doping area 407 of the transistor T21 is floating, and a positive voltage is formed between the gate metal layer 407 of the transistor T21 and the N+ doping area 403, such that the electrons in the N-TYPE semiconductor 401 move toward the gate metal layer 407, and the holes move toward the N+ doping area 403. As a result, the electrons in the body of the transistor T21 are injected into the channel of the transistor T21 for de-trapping the holes. As illustrated in FIG. 4B, during the time period TD3, the second switch SW2 is turned on, and the third switch SW3 is turned off. The voltage at the control end of the transistor T21 may attract the holes to form the channel.

Figure 5:
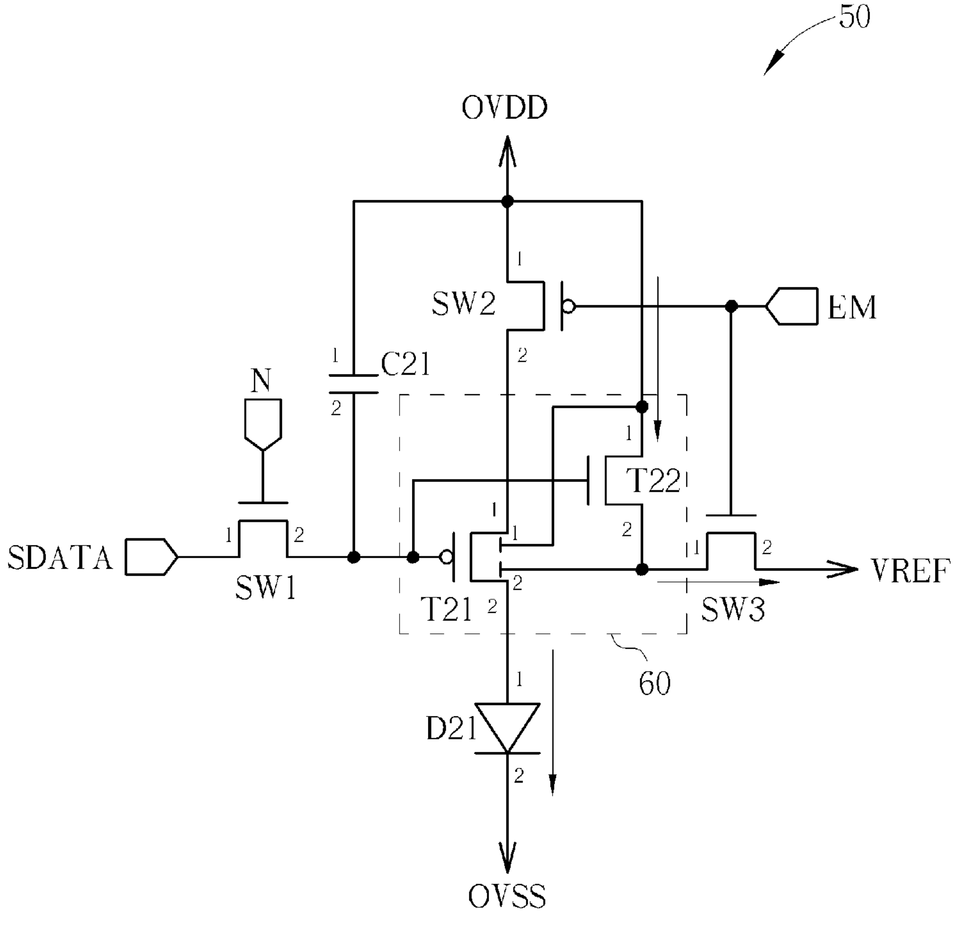
FIG. 5 is a diagram illustrating a pixel driving circuit of an OLED according to the second embodiment of the present invention.

FIG. 5 is a diagram illustrating a pixel driving circuit 50 of an OLED according to the second embodiment of the present invention. The pixel driving circuit 50 includes a first switch SW1, a capacitor C21, a first transistor T21, a second transistor T22, a second switch SW2, a third switch SW3 and an OLED D21. The first switch SW1 includes a first end for receiving the data signal SDATA and a control end for receives a data signal SDATA and a control end for receiving a scan signal N. The capacitor C21 includes a first end coupled to a first voltage source OVDD and a second end coupled to a second end of the first switch SW1. The transistor T21 includes a control end coupled to the second end of the capacitor C21. The second transistor T22 and the first transistor T21 form a common-gate/body structure in which the first end of the body of the first transistor T21 is a first end of the second transistor T22, the control end of the first transistor T21 is a control end of the second transistor T22, and the second end of the body of the first transistor T21 is a second end of the second transistor T22. The second switch SW2 includes the first end coupled to the first voltage source OVDD, the second end coupled to the first end of the transistor T21, and the control end for receiving a control signal EM. The third switch SW3 includes a first end coupled to the body of the transistor T21, a second end coupled to a reference voltage source VREF, and a control end for receiving the control signal EM. The OLED D21 includes a first end coupled to the second end of the transistor T21 and a second end coupled to a second voltage source OVSS. The second switch SW2 and the third switch SW3 are complementary switches, among which only one switch is turned on at the same time. In the present embodiment, the first switch SW1 and the third switch SW3 are N-TYPE transistors, while the second switch SW2 and the transistor T21 are P-TYPE transistors.

Figure 6:
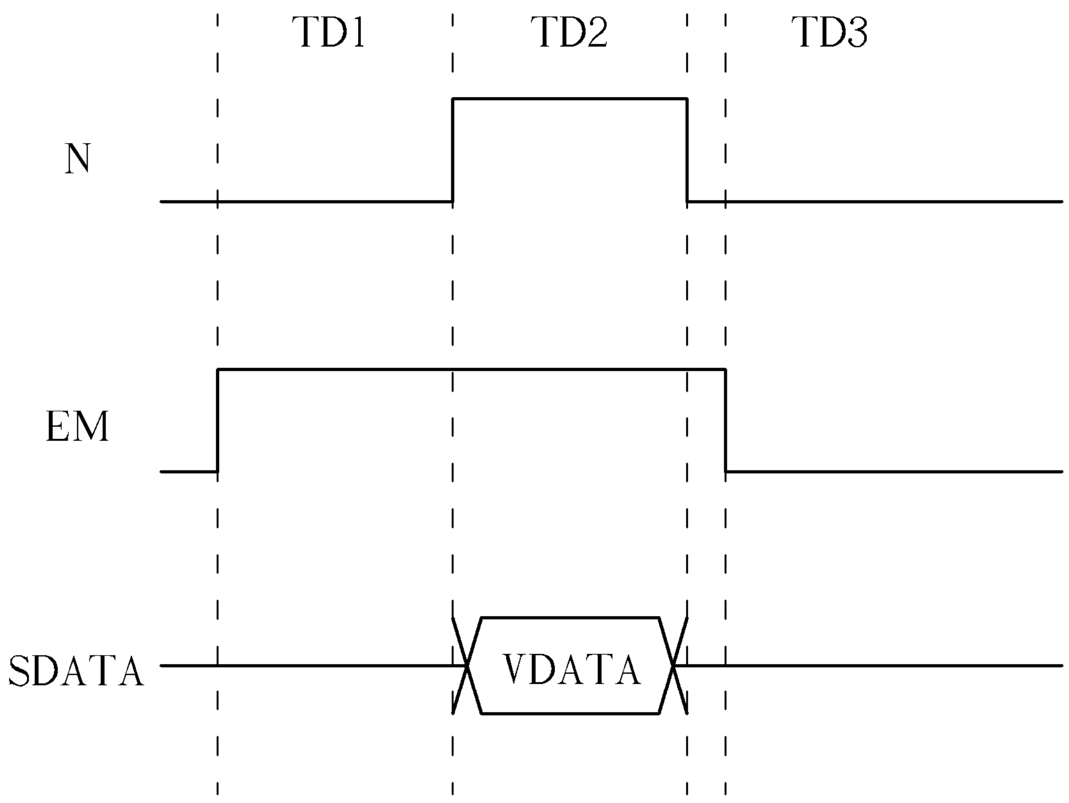
FIG. 6 is an operational wave diagram of the pixel driving circuit in FIG. 5.

FIG. 6 is an operational wave diagram of the pixel driving circuit 50 in FIG. 5. The operation of the pixel driving circuit 50 mainly includes 3 stages: resetting, data writing, and driving for light emission. During a time period TD1 when the pixel driving circuit 50 performs resetting, the first switch SW1 is turned off by the logic low scan signal N, the second switch SW2 is turned off by the logic high control signal EM, and the third switch SW3 is turned on. Therefore, the second end of the transistor T22 is coupled to the reference voltage VREF via the third switch SW3, and the transistor T21 receives the voltage stored in the capacitor C21 at the control end, wherein the reference voltage VREF is a negative voltage. Since the first transistor T21 and the second transistor T22 forms a common-base structure, the electron flow generated between the first and second ends of the transistor T22 may flows into the channel of the transistor T21 in order to help de-trap holes. If residual holes remain in the channel of the transistor T21, the next emission of the OLED D21 would be influenced, thereby causing image retention when switching images. The pixel driving circuit 50 of the present invention may improve image retention by de-trapping holes in the channel of the transistor T21.

During a time period TD2 when the pixel driving circuit 50 performs data writing, the first switch SW1 is turned on by the logic high scan signal N, thereby allowing the data voltage VDATA to be transmitted to the control end of the transistor T21. On the other hand, the second switch SW2 remains off and the third switch SW3 remains on as the control signal EM remains logic high during the time period TD2, thereby allowing hole de-trapping to proceed in the channel of the transistor T21.

During a time period TD3 when the pixel driving circuit 50 drives the OLED D21 for light emission, the first switch SW1 and the third switch are turned off and the second switch is turned on as the scan signal N and the control signal EM switch to logic low. When the third switch SW3 is turned off, the body of the transistor T21 is floating. The transistor T21 forms a channel according to the voltage at the control end. Therefore, the driving current IOLED of the OLED D21 is determined by the transistor T21. References may be made to FIGS. 7A and 7B for a circuit layout 60 of the first transistor T21 and the second transistor T22.

Figure 7A:
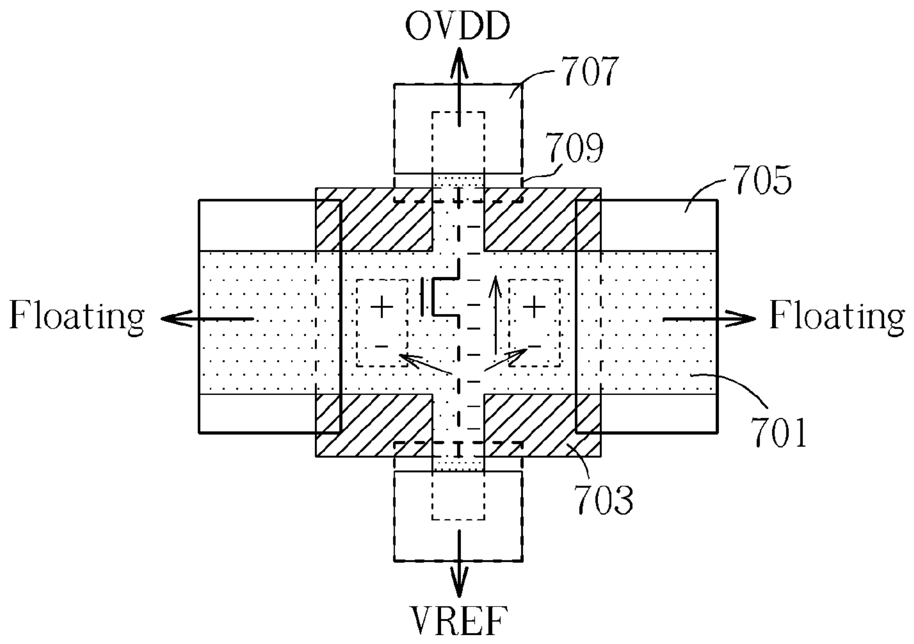
FIG. 7A is a diagram illustrating the process of de-trapping holes.
Figure 7B:
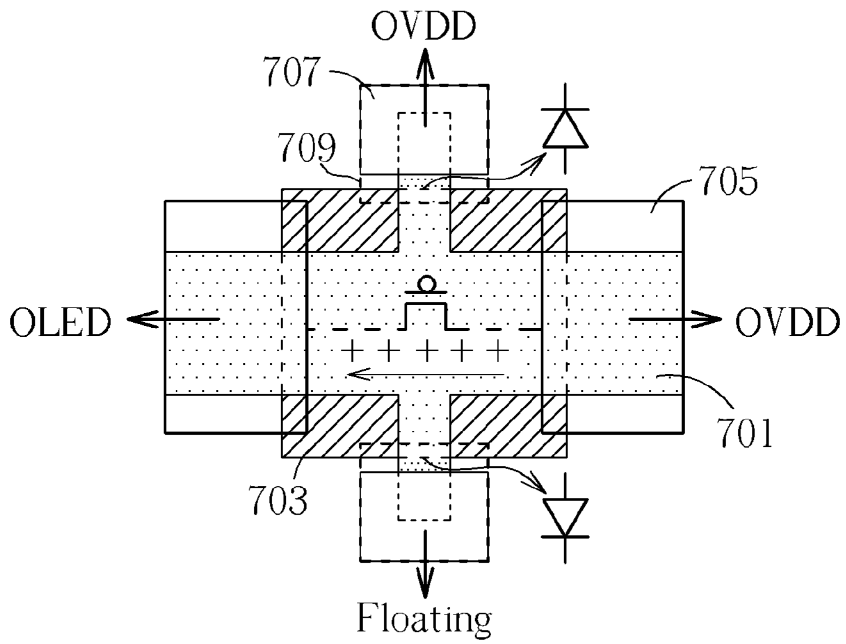
FIG. 7B is a diagram illustrating the driving of the transistor for light emission.

FIG. 7A is a diagram illustrating the process of de-trapping holes in the transistor. FIG. 7B is a diagram illustrating the driving of the transistor for light emission. As a P-TYPE transistor, the body of the transistor T21 is a poly-silicon layer 701, the control end of the transistor T21 is formed by a gate metal layer 703, and the first end and the second end of the transistor T21 are formed by a P+ doping area 705. On the other hand, as an N-TYPE transistor, the body of the transistor T22 is the poly-silicon layer 701, the control end of the transistor T22 is formed by the gate metal layer 703, and the first end and the second end of the transistor T22 are formed by an N+ doping area 709. As illustrated in FIG. 7A, during the time periods TD1 and TD2, the second switch SW2 is turned off and the third switch SW3 is turned on. Therefore, the P+ doping area 407 of the transistor T21 is floating, the first end of the transistor T22 is coupled to the first voltage source OVDD and the second end of the transistor T22 is coupled to the reference voltage VREF. Since the transistor T22 is an N-TYPE transistor, the electron flow generated between the first and second ends of the transistor T22 may be injected into the channel of the transistor T21 for de-trapping the holes. As illustrated in FIG. 4B, during the time period TD3, the second switch SW2 is turned on, and the third switch SW3 is turned off. The voltage at the control end of the transistor T21 may attract the holes to form the channel. On the other hand, the first end of the second transistor T22 is coupled to the first voltage source OVDD, and the second end of the transistor T22 is floating. Hence there are reverse diodes formed between the poly-silicon layer 701 and the N-doping area 709, and the operation of the first transistor T21 would not be effected.

In summary, according to the present invention, the pixel driving circuit of organic light emitting diode includes a first switch, a capacitor, a transistor, a second switch, a third switch and an organic light emitting diode. The operation of the present pixel driving circuit mainly includes three stages of transistor resetting, data writing and driving for light emission. The present pixel driving circuit may reset the transistor in order to de-trap holes during transistor resetting and data writing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel driving circuit of an organic light emitting diode (OLED), comprising:
- a first switch, including:
  - a first end arranged to receive a data signal;
  - a second end; and
  - a control end arranged to receive a scan signal;
- a capacitor, including:
  - a first end coupled to a first voltage source, and;
  - a second end coupled to the second end of the first switch;
- a transistor, including:
  - a first end;
  - a control end coupled to the second end of the capacitor;
  - a second end; and
  - a body;
- a second switch, including:
  - a first end coupled to the first voltage source;
  - a second end coupled to the first end of the transistor; and
  - a control end arranged to receive a control signal;
- a third switch, including:
  - a first end coupled to the body of the transistor;
  - a second end coupled to a reference voltage source; and
  - a control end arranged to receive the control signal, wherein when the third switch is turned on, the body of the transistor is coupled to the reference voltage source via the third switch and arranged to receive the reference voltage, thereby biasing the body of the transistor to a level lower than a level of the control end of the transistor, such that electrons of the body of the transistor are injected into a channel of the transistor for de-trapping holes and resetting the transistor; and
- an OLED, including:
  - a first end coupled to the second end of the transistor; and
  - a second end coupled to a second voltage source.

2. The pixel driving circuit of claim 1, wherein the first switch and the third switch are N-type transistors, and the second switch and the transistor are P-type transistors.

3. The pixel driving circuit of claim 1, wherein the second switch is turned on when the third switch is turned off, and the second switch is turned off when the third switch is turned on.

4. The pixel driving circuit of claim 1, wherein when the first switch and the second switch are turned off and the third switch is turned on, the body of the transistor is coupled to the reference voltage source via the second switch, such that electrons of the body of the transistor are injected into a channel of the transistor for de-trapping holes.

5. The pixel driving circuit of claim 1, wherein when the first switch and the third switch are turned on and the second switch is turned off, the data voltage is transmitted to the control end of the transistor via the first switch.

6. The pixel driving circuit of claim 5, wherein when the first switch and the third switch are turned off and the second switch is turned on, the OLED is driven by a current generated according to the data voltage.

7. A pixel driving circuit of an OLED, comprising:

a first switch, including:

a first end arranged to receive a data signal;

a second end; and a control end arranged to receive a scan signal;

a capacitor, including:

a first end coupled to a first voltage source; and a second end coupled to the second end of the first switch;

a first transistor, including:

a first end;

a control end coupled to the second end of the capacitor;

a second end; and a body having a first end coupled to the first voltage source and a second end;

a second transistor, including:

a first end coupled to the first end of the body of the first transistor;

a control end coupled to the control end of the first transistor; and a second end coupled to the second end of the body of the first transistor;

a second switch, including:

a first end coupled to the first voltage source;

a second end coupled to the first end of the first transistor; and a control end arranged to receive a control signal;

a third switch, including:

a first end coupled to the second end of the second transistor;

a second end coupled to a reference voltage source; and a control end arranged to receive the control signal, wherein when the third switch is turned on, the second end of the body of the first transistor is coupled to the reference voltage source via the third switch and arranged to receive the reference voltage, thereby biasing the body of the first transistor to a level lower than a level of the control end of the first transistor, and the second end of the second transistor is coupled to the reference voltage source via the third switch, such that electrons generated between the first and second ends of the second transistor flow through a channel of the first transistor for de-trapping holes; and an OLED, including:

a first end coupled to the second end of the first transistor; and a second end coupled to a second voltage source.

8. The pixel driving circuit of claim 7, wherein the first switch the third switch are of the same type and the second transistor comprises a N-TYPE transistor, the second switch and the first transistor are P-TYPE transistors.

9. The pixel driving circuit of claim 7, wherein the second switch is turned on when the third switch is turned off, and the second switch is turned off when the third switch is turned on.

10. The pixel driving circuit of claim 7, wherein the second end of the second transistor is coupled to the reference voltage source via the third switch further when the first switch and the second switch are turned off.

11. The pixel driving circuit of claim 7, wherein when the first switch and the third switch are turned on and the second switch is turned off, the data signal is transmitted to the second end of the capacitor via the first switch.

12. The pixel driving circuit of claim 11, wherein when the first switch and the third switch are turned off and the second switch is turned on, the OLED is driven according to a current generated according to the data voltage to emit light.

* * * * *